UNITED STATES PATENT OFFICE.

RENÉ BOHN, OF MANNHEIM, ASSIGNOR TO THE BADISCHE ANILIN AND SODA FABRIK, OF LUDWIGSHAFEN, GERMANY.

BLUE DYE.

SPECIFICATION forming part of Letters Patent No. 484,697, dated October 18, 1892.

Application filed March 17, 1892. Serial No. 425,242. (No specimens.) Patented in Germany January 27, 1891, No. 59,868, and in France March 2, 1891, No. 211,806.

*To all whom it may concern:*

Be it known that I, RENÉ BOHN, doctor of philosophy, a citizen of the Swiss Republic, residing at Mannheim, in the Grand Duchy of Baden and Empire of Germany, have invented new and useful Improvements in the Manufacture of a New Blue Dye, (for which I have obtained patents in Germany, No. 59,868, dated January 27, 1891, and in France, No. 211,806, dated March 2, 1891,) of which the following is a specification.

This invention is based upon the discovery that tetraalkyldiamido-benzophenone can be made to combine with dihydroxynapthaline to yield a new dye-stuff. The said new dye-stuff has the valuable property of combining with metallic mordants and dyes fiber previously impregnated with such mordants in beautiful even shades, ranging from greenish to more violet blue.

The following example illustrates the manner in which my invention can be carried into practical effect and my new dye produced. The parts are by weight. Mix together about one hundred (100) parts of tetramethyldiamido-benzophenone with about two hundred (200) parts of phosphorous oxychloride and heat the mixture for about ten (10) minutes on the boiling-water bath. Then add to the melt so obtained about sixty (60) parts of dihydroxynaphthaline, (using, say, the variety melting at 186° centigrade and known to chemists as "2.2' dihydroxynaphthaline.") Stir well and continue heating on the boiling-water bath for about two (2) hours. Allow to cool. Then carefully dissolve the whole product in about two hundred and sixty (260) parts of ordinary acetic acid, containing about thirty per cent. (30%) of glacial acetic acid. Pour the solution into water. Filter off the dye-stuff which separates out, and wash well with water. The paste so obtained can be directly used for dyeing or printing or can be brought into commerce as a dry powder. By working exactly as above described the new dye-stuff is obtained in a form which gives greenish-blue shades on chrome-mordanted wool.

The following alterations may be made in the above example without materially changing the character of the product obtained. Instead of the tetramethyldiamido-benzophenone prescribed the equivalent quantity of the tetraethyl compound can be used; also, instead of the 2.2' dihydroxynaphthaline (fusing-point 186°) the same quantity of 2.3 dihydroxynaphthaline (fusing-point 160° to 161°) may be taken. The dye-stuff obtained in this latter case gives more violet shades of blue on dyeing on a chrome-mordant.

My new dye-stuff in the free state, as obtained by precipitation from acetic-acid solution, is characterized by the following properties: It occurs in the form of paste or when dry as a dark-colored powder possessing a metallic sheen. It is slightly soluble in cold water, more readily soluble in hot water, and yields solutions of a greenish to violet-blue color. It is soluble in alcohol and practically insoluble in benzine. It is soluble in concentrated sulphuric acid, and gives a brownish yellow or green solution accordingly as 2.2' dihydroxynaphthaline or 2.3 dihydroxynaphthaline has been used. In alkaline-carbonate and in caustic-alkaline solutions it dissolves with a blue color. It dyes animal or vegetable fiber which has been previously impregnated with a metallic mordant—preferably a chrome mordant—in greenish to violet shades of blue, the greener shades being obtained when the 2.2' dihydroxynaphthaline is used in the preparation of the dye.

The chemical constitution of certain specimens of the new dye-stuff in its uncombined condition has been found to be represented by the following formula:

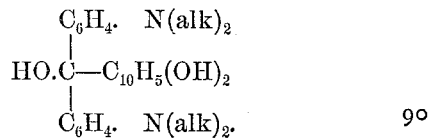

What I claim as new, and desire to secure by Letters Patent, is—

1. The new blue dye, which can be derived from tetraalkyldiamido-benzophenone and dihydroxynaphthaline and which is slightly soluble in cold water, more readily in hot water, giving greenish to violet-blue solutions, soluble in alcohol, practically insoluble in benzine, soluble in aqueous alkalies, giving blue solutions, soluble in concentrated sulphuric acid, and giving either a green or a brown solution, all substantially as described.

2. The process of manufacturing coloring-matter, which consists in combining tetraalkyldiamido-benzophenone with dihydroxynaphthaline by the aid of a condensing agent, such as phosphorus oxychloride, substantially as described.

In testimony whereof I have hereunto set my hand in the presence of two subscribing witnesses.

RENÉ BOHN.

Witnesses:
ERNEST F. EHRHARDT,
CARL KLOTZ.